US012331492B2

(12) United States Patent
Braun et al.

(10) Patent No.: US 12,331,492 B2
(45) Date of Patent: Jun. 17, 2025

(54) MACHINE DIAGNOSTIC SYSTEM AND METHOD BASED ON EXPECTED CONTROLLERS IDENTIFICATION AND COMMUNICATION

(71) Applicant: Deere & Company, Moline, IL (US)

(72) Inventors: Jesse A. Braun, Waukee, IA (US); Graham S. Anderson, Cedar Falls, IA (US); Vaibhav Madalagi, Bettendorf, IA (US)

(73) Assignee: Deere & Company, Moline, IL (US)

( * ) Notice: Subject to any disclaimer, the term of this patent is extended or adjusted under 35 U.S.C. 154(b) by 173 days.

(21) Appl. No.: 18/454,664

(22) Filed: Aug. 23, 2023

(65) Prior Publication Data

US 2025/0067028 A1 Feb. 27, 2025

(51) Int. Cl.

*E02F 9/26* (2006.01)
*G07C 5/00* (2006.01)
*G07C 5/08* (2006.01)

(52) U.S. Cl.

CPC .............. *E02F 9/267* (2013.01); *G07C 5/008* (2013.01); *G07C 5/0808* (2013.01); *G07C 5/0825* (2013.01)

(58) Field of Classification Search

None

See application file for complete search history.

(56) References Cited

U.S. PATENT DOCUMENTS

| | | | | |
|---|---|---|---|---|
| 5,980,078 | A | 11/1999 | Krivoshein et al. | |
| 8,213,321 | B2 | 7/2012 | Butts et al. | |
| 8,412,406 | B2 | 4/2013 | Johnson et al. | |
| 8,751,100 | B2 | 6/2014 | Johnson et al. | |
| 9,110,951 | B2 | 8/2015 | Jiang | |
| 9,694,834 | B2 * | 7/2017 | Shubs, Jr. | G06F 3/0482 |
| 10,217,066 | B1 | 2/2019 | Margherio et al. | |
| 10,235,631 | B2 | 3/2019 | Singh et al. | |
| 10,311,527 | B2 | 6/2019 | Pfeiffer et al. | |
| 2008/0059080 | A1 * | 3/2008 | Greiner | H04L 43/16 702/182 |

(Continued)

*Primary Examiner* — Abdhesh K Jha

(74) *Attorney, Agent, or Firm* — Gary L. Montle; Lucian Wayne Beavers; Patterson Intellectual Property Law, PC

(57) ABSTRACT

A diagnostic method, executable for example from remote computing devices or onboard control units for machines having various systems, each system having associated electronic controllers. For a specified machine and configuration, a hierarchical list is automatically generated comprising systems associated with the machine and one or more expected electronic controllers for each system. At least pursuant to initiation of a diagnostic program via an onboard control unit of the specified machine, respective input signals are obtained from present electronic controllers in functional communication with the onboard control unit. For each of any expected electronic controllers for which respective input signals are not obtained, a status alert is generated corresponding to a determined missing status or failure status, wherein the determined missing or failure status is based on an optionality of the respective expected electronic controller for which respective input signals are not obtained and/or an optionality of the corresponding system.

20 Claims, 4 Drawing Sheets

(56) References Cited

U.S. PATENT DOCUMENTS

| | | | | |
|---|---|---|---|---|
| 2009/0005928 | A1* | 1/2009 | Sells | G07C 5/0808 701/31.7 |
| 2011/0004589 | A1 | 1/2011 | Rischar et al. | |
| 2012/0101639 | A1 | 4/2012 | Carralero et al. | |
| 2013/0054633 | A1 | 2/2013 | Baust | |

* cited by examiner

FIG. 3
System Diagnostics
Controllers
Trouble Codes
CAN Bus
Network
Show: All Controllers
Sort by: Has Codes
Controller
Code(s)
Msg Count
Virtual Terminal Vehicle
VTv.001 | 0x26 | Vehicle
Yes
5123
Virtual Terminal Vehicle
VTi.001 | 0x84 | Implement
Yes
8975
Headway
NAV.001 | 0x2a | Vehicle
Yes
12154
On-Board Diagnostics
MPD.001 | 0x2B | Vehicle
212
Cab Controller
CLC.001 | 0x31 | Vehicle
4371
Roof Controller
VTv.001 | 0x26 | Vehicle
Inactive
0 Reset Msg Counts
Last Reset 04-16-2012, 3:43 PM

MACHINE DIAGNOSTIC SYSTEM AND METHOD BASED ON EXPECTED CONTROLLERS IDENTIFICATION AND COMMUNICATION

FIELD OF THE DISCLOSURE

The present disclosure relates generally to a method and system for machine diagnostics, based for example on identification of expected controllers based on a machine configuration and comparison of the expected controllers against a current set of communicating controllers.

BACKGROUND

Service technicians are conventionally tasked with troubleshooting many different forms and vintages of work machines, including but not limited to work vehicles of various types, each presenting a number of possible equipment configurations including system attachments, implements, and the like, with each system still further having a number of associated electronic controller devices for interfacing with sensors, controlling local actuators, etc.

As such, it can be difficult for a technician to recall what electronic devices should be present on a piece of equipment during diagnostic or repair procedures. They may conventionally rely on field referencing in the technical manual on their laptop, but even this is practically limited in effectiveness, at least because optional or aftermarket equipment is commonly implemented and the configuration of a given machine can reasonably vary across a number of practical applications.

While these sources can provide assistance, they are often more difficult to access than via the machine display which can perform an increasing amount of diagnostic procedures. Understanding which electronic devices should be present when diagnosing a machine is accordingly one of the most difficult issues for service technicians using conventional tools.

BRIEF SUMMARY

The current disclosure provides an enhancement to conventional systems, at least in part by introducing a novel system and method to provide machine unique historical device presence information and to reduce diagnostic times.

During development, each electronic device may be given a device identifier to differentiate between each instance on a work machine. Additionally, the respective electronic device is defined as being required or detachable for use by items such as implements, front end equipment, or other systems that may be added and removed from the work machine under normal operation. All electronic devices may further in the manufacturing process be programmed with a unique product identifier, such as a Product Identification Number (PIN).

An onboard device (such as may be associated with the primary user display interface) is tasked with monitoring the electronic device participants and beginning to build lists of historical participants by unique product identifiers (e.g., PIN, Device ID). For example, on a tractor there may be a list for the tractor itself, as well as lists for planters, air seeders, and other implements. When the diagnostic tool function is accessed, the system shall review the communication networks for currently present devices and compare it against the historical list. When an electronic device is determined to be present from a unique product identifier, for example a PIN associated with a complete product/system, the system may expect that all non-detachable controllers from that corresponding system will be present.

The diagnostic tool may present the user with a list of all the present controllers and the controllers that are expected to be present but are not with a special indication that they were not found. The device participant list can be manually altered by a user, as well as automatically recognize over longer periods of time that a system, device, or other form of detachable equipment has been removed.

Through these functions, the service technician can quickly visualize which device(s) were present on the "healthy" machine, but are no longer responding. They are now able to focus their diagnostic time in the most relevant area to complete a quick repair, increasing customer uptime and satisfaction.

According to a first embodiment, a computer-implemented diagnostic method is disclosed for machines having one or more systems, each of the systems having one or more associated electronic controllers. For a specified machine to be diagnosed, the method includes automatically generating a hierarchical list comprising one or more systems associated with a configuration of the specified machine and one or more expected electronic controllers for each of the one or more systems and, at least pursuant to initiation of a diagnostic program via an onboard control unit of the specified machine, obtaining respective input signals from present electronic controllers in functional communication with the onboard control unit. For each of any expected electronic controllers for which respective input signals are not obtained, the method further includes generating a status alert corresponding to a determined missing status or failure status, wherein the determined missing or failure status is based at least in part on an optionality of the respective expected electronic controller for which respective input signals are not obtained and/or an optionality of the corresponding system.

In an exemplary aspect according to the first embodiment, a probability vector for each comprises a missing option and a failure option, each option of the probability vector having a value determined according to the optionality of the respective expected electronic controller for which respective input signals are not obtained and historical data associated with the machine regarding the respective expected electronic controller and/or the corresponding system.

The historical data may for example include runtime data for the respective expected electronic controller and/or the corresponding system, and/or data from one or more onboard machine sensors and/or other electronic controllers collaborating a presence of the respective expected electronic controller.

In another exemplary aspect according to the first embodiment and optionally any one or more of the above-referenced aspects, the method may include, pursuant to obtaining respective input signals from any one or more unexpected electronic controllers, generating a revised hierarchical list based at least in part on the one or more unexpected electronic controllers and the respectively corresponding systems.

In another exemplary aspect according to the first embodiment and optionally any one or more of the above-referenced aspects, the method may include, pursuant to user input manually altering the configuration of the specified machine to be diagnosed, at least one of the one or more systems associated with the configuration of the specified machine, and/or at least one of the one or more expected electronic controllers for each of the one or more systems, generating a revised hierarchical list based at least in part on the user input.

In another exemplary aspect according to the first embodiment and optionally any one or more of the above-referenced aspects, the diagnostic program may be executed from the onboard control unit via a user interface selection between a diagnostic operating mode and a standard operating mode.

In another exemplary aspect according to the first embodiment and optionally any one or more of the above-referenced aspects, the diagnostic may be executed from a remote computing device in functional communication with the onboard control unit, and input signals from the present electronic controllers are received at the remote computing device via the onboard control unit and communications networks respectively associated with the corresponding systems.

In another exemplary aspect according to the first embodiment and optionally any one or more of the above-referenced aspects, at least pursuant to initiation of the diagnostic program, the onboard control unit of the specified machine may poll for responsive input signals from any present electronic controllers via communications networks corresponding to the one or more systems, wherein the responsive input signals comprise messages including identifiers of the respective electronic controllers.

In another exemplary aspect according to the first embodiment and optionally any one or more of the above-referenced aspects, at least pursuant to initiation of the diagnostic program, the onboard control unit of the specified machine may receive broadcast input signals comprising identifiers of the respective electronic controllers.

In a second embodiment, a computing device such as for example in a cloud computing environment, one or more remote hosted servers, a mobile user computing device, or the like may be configured to direct the performance of a method according to the first embodiment and optionally any one or more of the above-referenced aspects.

In a third embodiment, a machine having self-diagnostic capabilities may include an onboard control unit configured to direct the performance of a method according to the first embodiment and optionally any one or more of the above-referenced aspects.

Numerous objects, features and advantages of the embodiments set forth herein will be readily apparent to those skilled in the art upon reading of the following disclosure when taken in conjunction with the accompanying drawings.

DETAILED DESCRIPTION

The implementations disclosed in the above drawings and the following detailed description are not intended to be exhaustive or to limit the present disclosure to these implementations. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination thereof described with respect to one example may be combined with the features, components, steps, or a combination thereof described with respect to other examples of the present disclosure.

Figure 1:
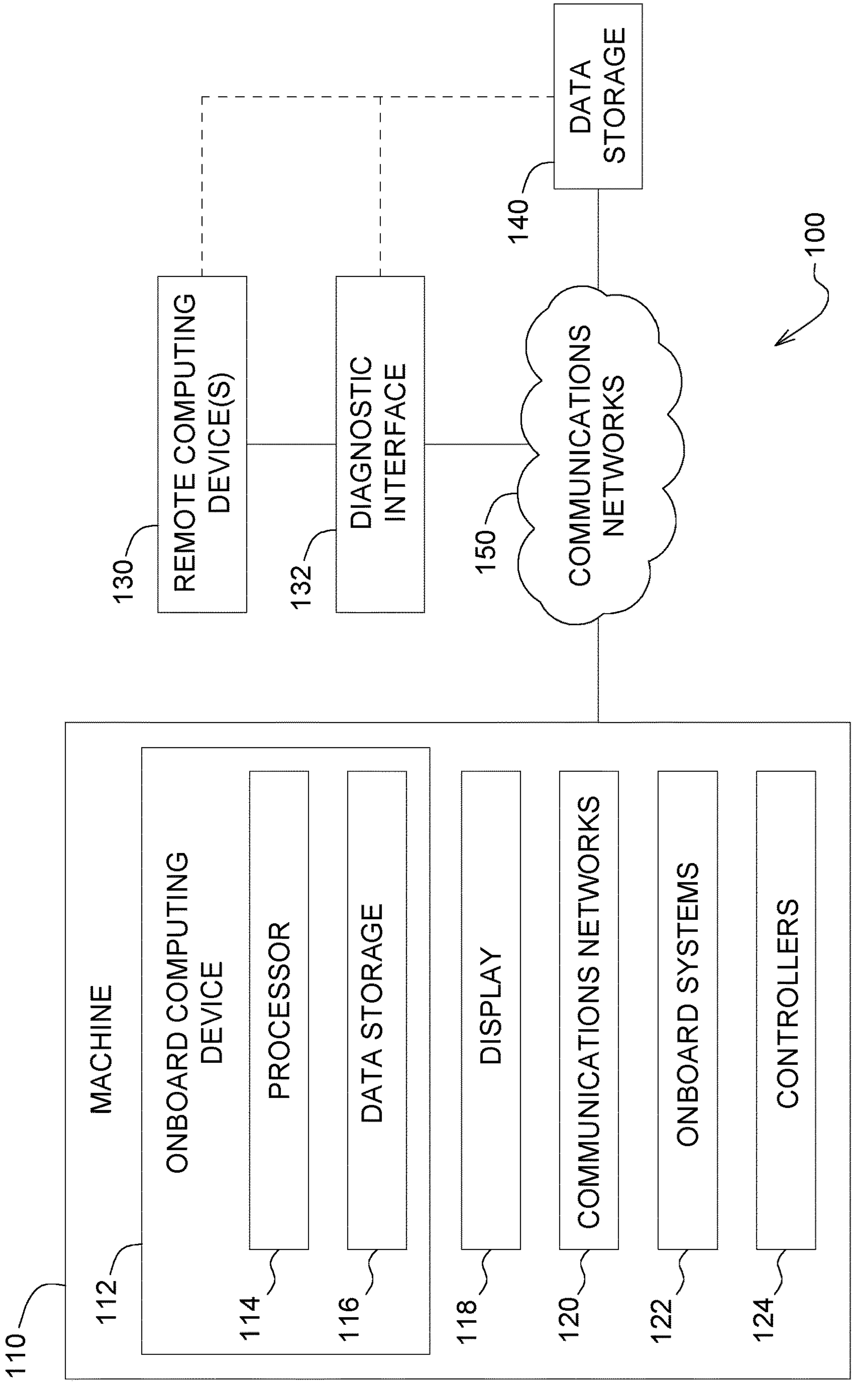
FIG. 1 is a block diagram representing a machine and diagnostic system according to an embodiment of the present disclosure.

As illustrated in FIG. 1, an exemplary diagnostic system 100 as disclosed herein may include one or more machines 110 functionally and/or communicatively linked via communications networks 150 to remote computing devices 130, associated diagnostic interfaces 132, data storage 140, and the like for providing or otherwise facilitating machine diagnostics.

A "machine" 110 within the scope of the present disclosure may include work vehicles that travel, self-propelled or otherwise, through a work area and may include a combine harvester, tractor, sprayer, excavator, track loader, feller buncher, dump truck, or the like. A machine 110 may also include units that are static or otherwise do not require movement through or across an area for functionality. A machine 110 may include an onboard computing device 112 (such as for example an electronic control unit or equivalent) having or otherwise functionally linked to a processor 114 and data storage 116, an onboard display 118, a communications device 120 (for example, for receiving and/or transmitting data via the communications networks 150, one or more onboard systems 122 for performing machine-specific work, and associated controllers 124.

The onboard display 118 may be optional in some cases, particularly for example where the machine 110 is autonomous or otherwise not manually operated from onboard the machine 110. In some embodiments, as noted below, the onboard display 118 may enable user selection of, and further perform at least some functions associated with, a diagnostic routine as further described herein. Generally speaking, an onboard display 118 and associated functionality may enable users to initiate or perform certain operations with respect to the machine 110, for example via user input mechanisms that allow the user to enter authentication information, start the machine, set certain operating parameters for the machine, or otherwise directly control the machine.

Various operations, steps or algorithms as described in connection with the onboard computing device 112 and/or remote computing device 130 can be embodied directly in hardware, in a computer program product such as software modules executed by respective processors 114, or in a combination of the two. For a respective device, a computer program product can reside in RAM memory, flash memory, ROM memory, EPROM memory, EEPROM memory, registers, hard disk, a removable disk, or any other form of computer-readable medium 152 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 114 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 120 may support or provide communications between the controller and external systems or devices, and/or support or provide communication interface with respect to internal components of the machine 110. The communications unit may include wireless communication system components (e.g., via cellular modem, WiFi, Bluetooth or the like) and/or may include one or more wired communications terminals such as universal serial bus ports.

The data storage 116 may, unless otherwise stated, generally encompass hardware such as volatile or non-volatile storage devices, drives, memory, or other storage media, as well as one or more databases residing thereon. For example, a diagnostic database associated with onboard data storage 116 or remote data storage 140 may comprise a database or another collection of data records or files that may be used to store a diagnostic history for a particular machine 110, onboard systems 122, controllers 124, and/or system-controller combinations, for example in the form of configuration files including representative hierarchical lists as further described herein.

Onboard (i.e., machine-specific) systems 122 in this context may be dependent on the type of machine 110. For example, different types of machines 110 may include work implements, traveling devices, sprayers, cameras, and other imaging and/or perception devices, etc., along with corresponding controllers 124. Each onboard system 122 for a given machine 110 may have one or more associated controllers 124, and in some contexts a single controller 124 may be associated with one or more onboard systems 122.

Figure 2:
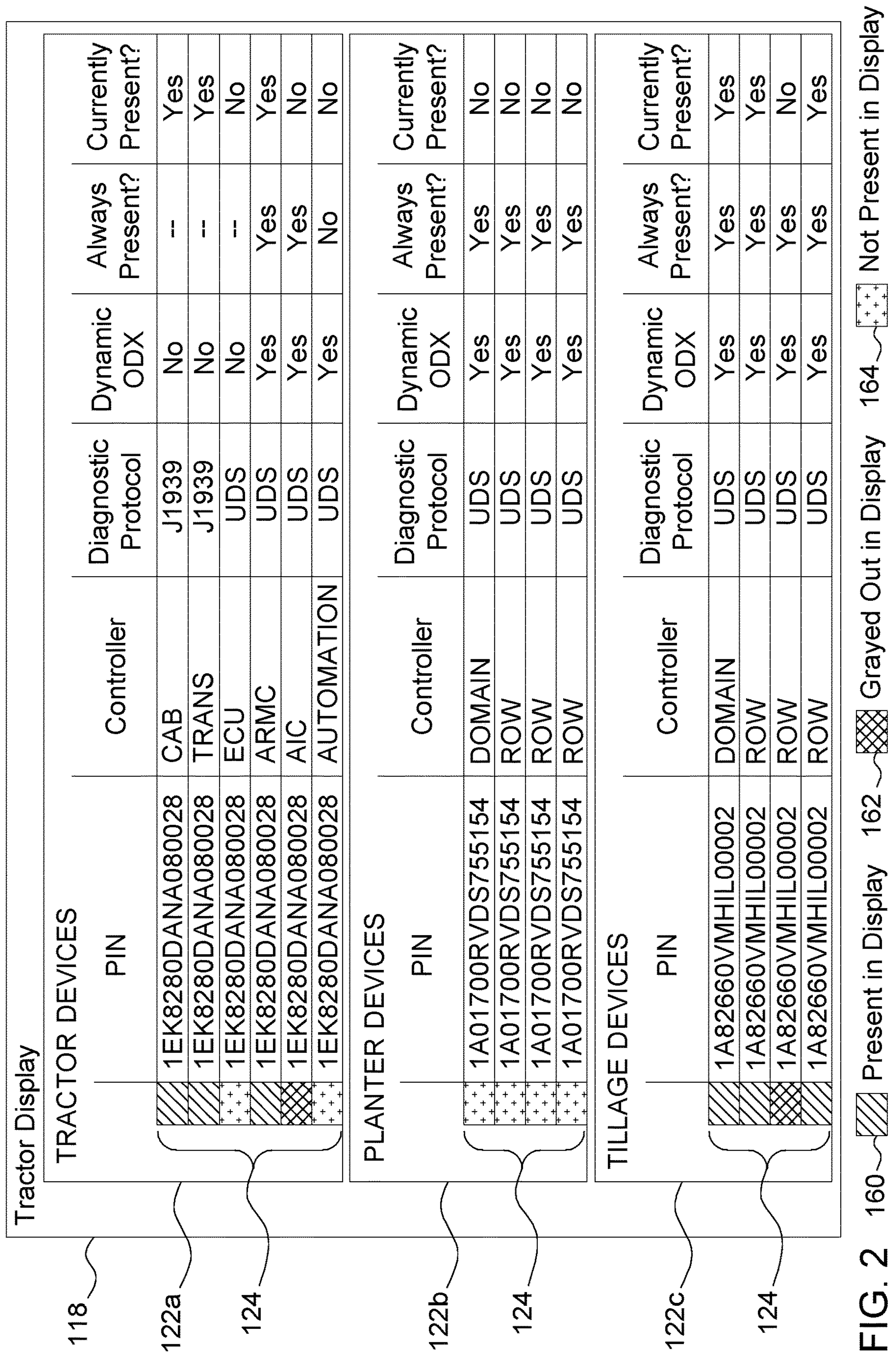
FIG. 2 is a block diagram representing an exemplary group of controllers in a machine according to an embodiment of the present disclosure.

Referring to FIG. 2, an exemplary display unit 118 may be generated, for example in association with execution of a diagnostic module, to list a number of onboard systems 122 associated with the machine 110. Each onboard system 122*a*, 122*b*, 122*c* may have a unique identifier (e.g., product identification number or "PIN") and as illustrated is associated with multiple controllers 124, each of which may be responsible for respective actions, inter-system communications, and the like.

In various embodiments for a given machine 110 or type of machine, a respective onboard system 122 may be permanent or otherwise required, or may be optional/detachable depending for example on an optional machine configuration or work use. The distinction may be predetermined upon manufacture or installation, or may be defined by user input, dynamically or programmatically based upon a specified configuration or work use. A state of an onboard system 122, and further of some or all associated controllers 124, may accordingly be defined such that a diagnostic module as further described herein may effectively determine or otherwise construe a presence or lack thereof for each expected device, system, and/or controller 124.

Figure 3:
FIG. 3 is a graphical diagram representing an exemplary display of controllers after a diagnostic routine according to an embodiment of the present disclosure.
Figure 4:
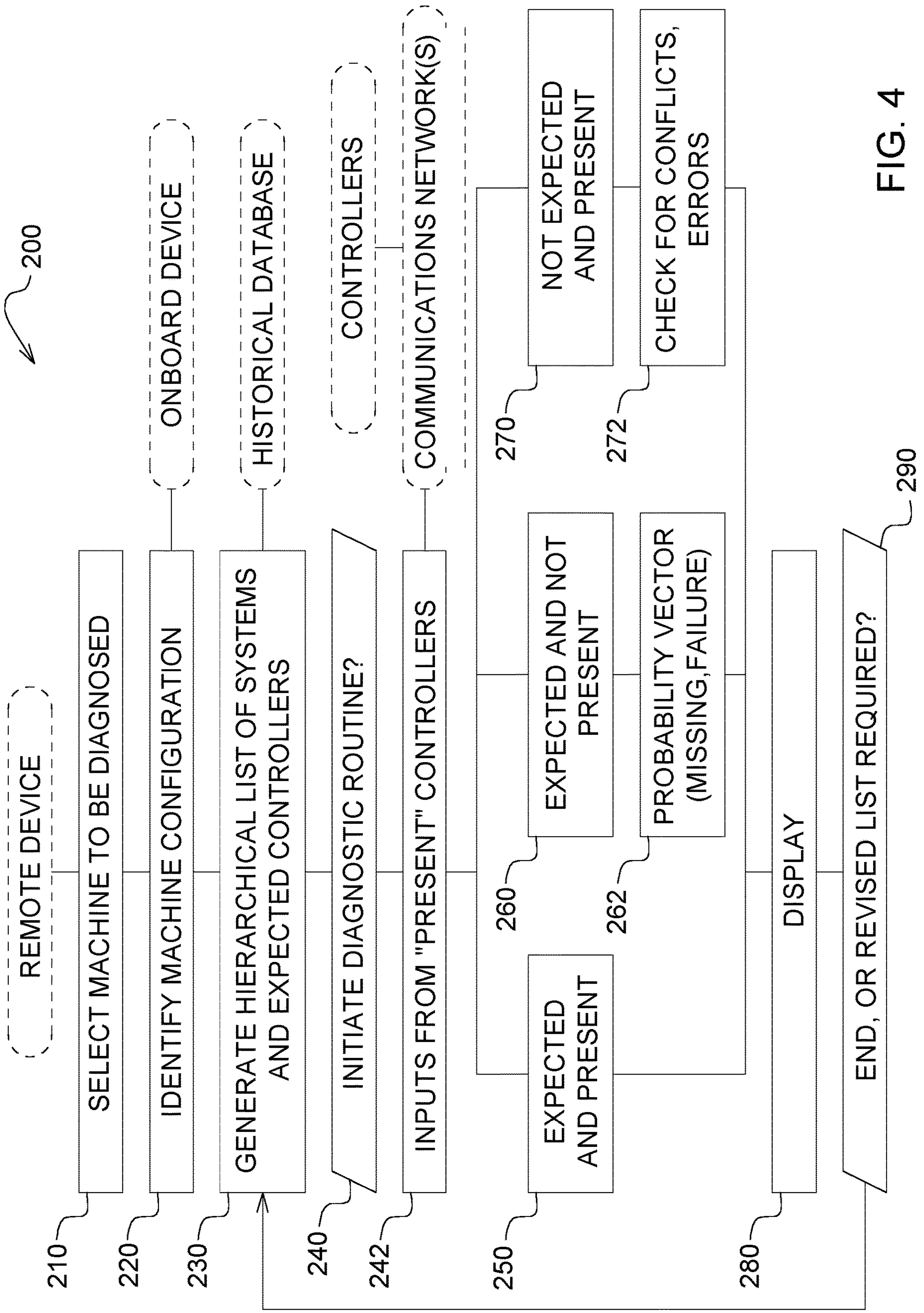
FIG. 4 is a flowchart representing an exemplary method according to an embodiment of the present disclosure.

Referring to FIG. 4, further by illustrative reference to FIGS. 2 and 3, a diagnostic method 200 may be described as implemented for example in a diagnostic system 100 as described above with respect to FIG. 1. The diagnostic method 200 may be implemented via an executable program, routine, or the like from an onboard control unit 112 (for example, by user selection between a normal operating mode and a diagnostic mode), or a remote computing device 130 in functional communication with the onboard control unit 112. In examples where the diagnostic routine is executed remotely, input signals from present electronic controllers 124 as described below may be received at the remote computing device 130 via the onboard control unit 112 and one or more communications networks 120 as may be respectively associated with the corresponding systems 122.

The method 200 may begin with selection of a particular machine 110 to be diagnosed (step 210), and accordingly identification of a machine configuration (step 220). Selection of a machine to be diagnosed may be based upon user input, for example upon connection of a remote device 130 and execution of a diagnostic program via corresponding interface 132, or may be programmatic in nature based upon a specified period of time, or event-based such as for example based upon completion of an activity or upon detecting installation or removal of an onboard system 122, etc. Identification of a machine configuration may likewise be based upon user input, for example via the diagnostic interface 132, or may for example be retrieved automatically from local data storage 116, or automatically determined by examination of onboard systems 122, historical performance data of the machine 110, etc.

In an exemplary and non-limiting embodiment as generally described herein, a tractor is selected as the machine 110 to be diagnosed upon execution from a remote computing device 130 of a diagnostic program via interface 132, the tractor configured with systems including one or more permanent devices 122*a*, one or more detachable planter devices 122*b*, and one or more detachable tillage devices 122*c*. In such an embodiment, the method 200 may include automatically generating (step 230) a hierarchical list comprising each of the onboard systems 122 associated with the present configuration of the machine 110 and further each of one or more "expected" electronic controllers 124 for each of the one or more onboard systems 122.

In an embodiment, upon selecting or otherwise identifying a machine 110 to be diagnosed, an initial hierarchical list may be retrieved from local data storage 116 or remote data storage 140, or a combination thereof, based upon a most recent hierarchical list from previous diagnostics, as may for example be associated with the identified machine 110. In another embodiment, the diagnostic routine may include a step of retrieving a model or template for hierarchical list generation based upon a type of machine, optionally further in view of a current application for the machine and/or one or more detected systems 122 (e.g., attachments, implements, and the like), wherein an initial hierarchical list for the present diagnostic is automatically generated based upon the model or upon population of the template using historical data, user input, and the like. Exemplary models may for example be iteratively developed and correlated with different types of machines and/or machine-system combinations, wherein such models may at least serve as a starting point for generation of a hierarchical list of system-controller combinations for a respective machine 110.

Models may for example be substantially empirical (i.e., based on specified or observed inputs corresponding to predetermined machine configurations) and/or further predictive in nature, in some embodiments enabling generation of a hierarchical list of expected systems 122, controllers 124, and system-controller combinations based on a current combination of user input, historical data, inputs from machine-specific sensors such as for example via a CAN bus, and the like.

Iterative development of such models may in some embodiments incorporate feedback from execution of diagnostics as further described herein, for example identifying historical examples where certain controllers have been expected but not present with respect to a given machine 110 and/or system 122, or unexpected but present with respect to a given machine 110 and/or system 122.

At least upon execution of the above-referenced diagnostic program and associated routine(s) (step 240), which may for example be initiated remotely but conducted via the onboard control unit (e.g., electronic control unit or other computing device) 112 of the machine 110, or may be initiated and executed via the onboard control unit 112 with results to be retrieved, pushed, broadcast, or otherwise delivered to the remote computing device 130 via interface 132, respective input signals may be obtained from present electronic controllers in functional communication via communication network(s) 120 with the onboard control unit 112 (step 242). For example, the onboard unit of the specified machine may poll for responsive input signals from any present electronic controllers via communications networks 120 corresponding to the present systems 122, wherein the responsive input signals comprise messages including identifiers of the respective electronic controllers 124.

In various embodiments, inputs from onboard electronic controllers 124 may be provided via unique communications networks 120 associated with a particular system 122, wherein the system-controller combination is readily identified for the hierarchical list, for example populating a defined template or otherwise based on correlations specified in accordance with an implemented model.

In other embodiments, an implemented model may classify inputs from electronic controllers 124 in accordance with a system 122 that has been input or otherwise detected for the machine 110 being diagnosed, based for example on known correlations of the controller with a specific type of system.

For example, the diagnostic program may initially determine that a planter is in use for a tractor, wherein specific communications networks 120 are functionally attributed to the planter and any inputs received across such networks 120 are further attributed to corresponding controllers 124. Alternatively, the diagnostic program may receive inputs across any communications network 120 associated with the machine 110, and provisionally classify a controller 124 generating such inputs in association with a particular system 122 (and in some cases even provisionally assigning the system 122 itself to the machine 110 based on the presence of such a controller 124).

For each of any expected electronic controllers 124 for which input signals are obtained (step 250), the respective controller may for example be identified as such in step 280 using flags, highlighting, or other equivalent indicia 160 in a diagnostic interface 132 associated with the executed routine, as represented in FIG. 2. The respective controller, having been identified as present, may further (or alternatively) be displayed or otherwise represented as present in a display 118 on a general user interface as represented in FIG. 3, which may enable user selection (via vertically oriented selection tabs on the left side of the general user interface in the present example) of a display 118 for indicating system controller status.

For each of any expected electronic controllers for which respective input signals are not obtained (step 260), a status alert may be generated in the display step (280) corresponding to, for example, a determined missing status or failure status, wherein the determined missing or failure status is based at least in part on a specified or determined optionality of the respective expected electronic controller for which respective input signals are not obtained, and/or a specified or determined optionality of the corresponding system 122.

In an embodiment, a probability vector may be generated (step 262) corresponding to a respective likelihood that the controller 124 is missing as opposed to having failed, wherein each option (e.g., missing or failed) has a value determined based for example on whether the system 122 associated with the controller 124 is understood to be detachable for a given application of the machine 110, whether the system 122 is understood to be required but the controller 124 itself is optionally detachable from the system 122, whether the system, controller, or system-controller combination has a representative history of being missing or failing for the machine 110, whether the diagnostic history indicates user input regarding the particular controller 124, etc.

Historical data to be utilized in generating the probability vector may for example include runtime data for the respective expected electronic controller, the corresponding system, and/or the system-controller combination. Historical data to be utilized in generating the probability vector may also or alternatively include data from onboard machine sensors, other electronic controllers, user input, and the like for collaborating a presence of the respective expected electronic controller.

The status alert for the respective missing or failed controller may for example be provided in step 280 using flags, highlighting, or other equivalent indicia 162 in the diagnostic interface 132 associated with the executed routine, as represented in FIG. 2. The respective controller, having been identified as not present, may further (or alternatively) be displayed but represented as not present in the general user interface as represented in FIG. 3, for example by graying out of the respective display portion on display 118.

In an embodiment, some missing or failed controllers may be displayed but grayed out, for example as a first indicator with respect to a particular status such as where the probability vector indicates the controller is not optional and likely failed, and other missing or failed controllers may be not displayed at all, for example as a second indicator wherein the probability vector indicates that the controller is optional and likely simply missing and not worth presenting via the general user interface.

For each of any electronic controllers 124 which are not initially expected when the diagnostic routine begins but for which respective input signals are obtained (step 270), such controllers may for example be indicated in the display step (280) as corresponding to, for example, a possible controller.

In an embodiment, the diagnostic routine may be configured to analyze (step 272) whether the presence of a respective controller is in conflict with the associated system 122 or with other systems 122 or controllers 124, and the likelihood of a configuration error. For this purpose, a probability vector may be generated corresponding to a respective likelihood that the controller 124 should have been expected or otherwise serves as an indicator that the corresponding system 122 has been attached to the machine 110, whether the controller 124 should be removed, whether the received signal is in error, etc., wherein each option for the probability vector has a value determined based for example on an optionality for the controller 124 and/or the system 122 associated with the controller 124, historical data associated with the respective system, controller, and/or system-controller combination, etc.

In an embodiment, pursuant to obtaining respective input signals from any unexpected electronic controllers, a revised hierarchical list may be automatically generated (step 290) based at least in part on the one or more unexpected electronic controllers 124 and the respectively corresponding systems 122, as for example other controllers 124 which would otherwise have been "expected" but missing in an initial diagnostic configuration may be reconsidered as not expected in a configuration which actually includes some or all of the previously unexpected controllers 124. In this case, the method 200 may return to step 230 and proceed again with the diagnostic routine.

In an embodiment, a revised hierarchical list may be generated pursuant to user input manually altering the configuration of the specified machine 110 to be diagnosed, at least one of the systems 122 associated with the configuration of the specified machine, at least one of the expected electronic controllers 124 for a given system-controller combination, or the like, wherein the method 200 may return to step 230 and proceed with a revised hierarchical list based at least in part on the user input.

In an embodiment, upon having generated a hierarchical list for which no revisions are apparent, and optionally further upon manual confirmation of a current list of systems, controllers, system-controller combinations, and the like, the hierarchical list may be stored for example in remote data storage 140 for selective retrieval during subsequent diagnostic routines, as may be executed locally or via an external computing device 130, via networks communicatively linked to the remote data storage 140.

In an embodiment, the hierarchical list may be locally stored for selective retrieval during subsequent diagnostic routines, whether for sole reference during the routines or at least for comparison and confirmation of the remotely stored hierarchical list. A stored hierarchical list may in some embodiments be modified and replaced, in other words stored in modified form as a writeable configuration file.

In some embodiments any number of hierarchical lists may be stored with version identifiers, such as for example with time/date stamps, as for example historical machine configuration files, wherein the sequence of stored hierarchical lists comprise part of the historical data that may be utilized for determining a probability that a particular system, controller, or system-controller combination is detachable or otherwise optional for a current configuration.

As noted above, a diagnostic tool as disclosed herein may present a user, such as for example a service technician, with a list of all the present controllers and the controllers that are expected to be present but are not with a special indication that they were not found. Through these functions, the service technician can quickly visualize which device(s) were present on the "healthy" machine, but are no longer responding, and may now focus their diagnostic time on the most relevant areas. In an embodiment (not expressly shown in the figures), a diagnostic routine as otherwise described above may be remotely executed and implemented, for example simultaneously or over a set period of time, for each of a plurality of machines. The results of such a collective diagnostic routine may specifically identify machines for which immediate servicing is required, for example where controllers are identified as missing or otherwise where an error is determined as probable based on the presence of unexpected controllers, etc., further facilitating efficient use of technician resources.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented diagnostic method for machines having one or more systems, each of the systems having one or more associated electronic controllers, the method comprising:

for a specified machine to be diagnosed, automatically generating a hierarchical list comprising one or more systems associated with a configuration of the specified machine and one or more expected electronic controllers for each of the one or more systems;

at least pursuant to initiation of a diagnostic program via an onboard control unit of the specified machine, obtaining respective input signals from present electronic controllers in functional communication with the onboard control unit;

for each of any expected electronic controllers for which respective input signals are not obtained, generating a status alert corresponding to a determined missing status or failure status, wherein the determined missing or failure status is based at least in part on an optionality of the respective expected electronic controller for which respective input signals are not obtained and/or an optionality of the corresponding system.

2. The method of claim 1, wherein a probability vector for each of the any expected electronic controllers for which respective input signals are not obtained comprises a missing option and a failure option, each option of the probability vector having a value determined according to the optionality of the respective expected electronic controller for which respective input signals are not obtained and historical data associated with the machine regarding the respective expected electronic controller and/or the corresponding system.

3. The method of claim 2, wherein the historical data comprises runtime data for the respective expected electronic controller and/or the corresponding system.

4. The method of claim 2, wherein the historical data comprises data from one or more onboard machine sensors and/or other electronic controllers collaborating a presence of the respective expected electronic controller.

5. The method of claim 1, comprising, pursuant to obtaining respective input signals from any one or more unexpected electronic controllers, generating a revised hierarchical list based at least in part on the one or more unexpected electronic controllers and the respectively corresponding systems.

6. The method of claim 1, comprising, pursuant to user input manually altering the configuration of the specified machine to be diagnosed, at least one of the one or more systems associated with the configuration of the specified machine, and/or at least one of the one or more expected electronic controllers for each of the one or more systems, generating a revised hierarchical list based at least in part on the user input.

7. The method of claim 1, wherein the diagnostic program is executed from the onboard control unit via a user interface selection between a diagnostic operating mode and a standard operating mode.

8. The method of claim 1, wherein the diagnostic is executed from a remote computing device in functional communication with the onboard control unit, and input signals from the present electronic controllers are received at the remote computing device via the onboard control unit and communications networks respectively associated with the corresponding systems.

9. The method of claim 1, wherein at least pursuant to initiation of the diagnostic program, the onboard control unit of the specified machine polls for responsive input signals from any present electronic controllers via communications networks corresponding to the one or more systems, wherein the responsive input signals comprise messages including identifiers of the respective electronic controllers.

10. The method of claim 1, wherein at least pursuant to initiation of the diagnostic program, the onboard control unit of the specified machine receives broadcast input signals comprising identifiers of the respective electronic controllers.

11. A computing device for diagnosing machines having one or more systems, each of the systems having one or more associated electronic controllers, the computing device configured to:

for a specified machine to be diagnosed, automatically generate a hierarchical list comprising one or more systems associated with a configuration of the specified machine and one or more expected electronic controllers for each of the one or more systems;

at least pursuant to initiation of a diagnostic program via an onboard control unit of the specified machine, obtain respective input signals from present electronic controllers in functional communication with the onboard control unit;

for each of any expected electronic controllers for which respective input signals are not obtained, generate a status alert corresponding to a determined missing status or failure status, wherein the determined missing or failure status is based at least in part on an optionality of the respective expected electronic controller for which respective input signals are not obtained and/or an optionality of the corresponding system.

12. The computing device of claim 11, wherein a probability vector for each of the any expected electronic controllers for which respective input signals are not obtained comprises a missing option and a failure option, each option of the probability vector having a value determined according to the optionality of the respective expected electronic controller for which respective input signals are not obtained and historical data associated with the machine regarding the respective expected electronic controller and/or the corresponding system.

13. The computing device of claim 12, wherein the historical data comprises one or more of:

runtime data for the respective expected electronic controller and/or the corresponding system; and data from one or more onboard machine sensors and/or other electronic controllers collaborating a presence of the respective expected electronic controller.

14. The computing device of claim 11, further configured, pursuant to obtaining respective input signals from any one or more unexpected electronic controllers, to generate a revised hierarchical list based at least in part on the one or more unexpected electronic controllers and the respectively corresponding systems.

15. The computing device of claim 11, further configured, pursuant to user input manually altering the configuration of the specified machine to be diagnosed, at least one of the one or more systems associated with the configuration of the specified machine, and/or at least one of the one or more expected electronic controllers for each of the one or more systems, to generate a revised hierarchical list based at least in part on the user input.

16. A machine having self-diagnostic capabilities, the machine comprising an onboard control unit configured to:

automatically generate a hierarchical list comprising one or more systems associated with a configuration of the machine and one or more expected electronic controllers for each of the one or more systems;

at least pursuant to initiation of a diagnostic program, obtain respective input signals from present electronic controllers in functional communication with the onboard control unit; and for each of any expected electronic controllers for which respective input signals are not obtained, generate a status alert corresponding to a determined missing status or failure status, wherein the determined missing or failure status is based at least in part on an optionality of the respective expected electronic controller for which respective input signals are not obtained and/or an optionality of the corresponding system.

17. The machine of claim 16, wherein a probability vector for each of the any expected electronic controllers for which respective input signals are not obtained comprises a missing option and a failure option, each option of the probability vector having a value determined according to the optionality of the respective expected electronic controller for which respective input signals are not obtained and historical data associated with the machine regarding the respective expected electronic controller and/or the corresponding system.

18. The machine of claim 17, wherein the historical data comprises one or more of:

runtime data for the respective expected electronic controller and/or the corresponding system; and from one or more onboard machine sensors and/or other electronic controllers collaborating a presence of the respective expected electronic controller.

19. The machine of claim 16, wherein the onboard control unit is configured, pursuant to obtaining respective input signals from any one or more unexpected electronic controllers, to generate a revised hierarchical list based at least in part on the one or more unexpected electronic controllers and the respectively corresponding systems.

20. The machine of claim 16, wherein the onboard control unit is configured, pursuant to user input manually altering the configuration of the specified machine to be diagnosed, at least one of the one or more systems associated with the configuration of the specified machine, and/or at least one of the one or more expected electronic controllers for each of the one or more systems, to generate a revised hierarchical list based at least in part on the user input.

* * * * *